United States Patent [19]

Böhnke et al.

[11] Patent Number: 4,487,697

[45] Date of Patent: Dec. 11, 1984

[54] BIOLOGICAL WASTE-WATER-TREATMENT METHOD

[75] Inventors: Botho Böhnke, Maria-Ther.-Allee 231, D-51 Aachen, Fed. Rep. of Germany; Bernd Diering, Aachen, Fed. Rep. of Germany

[73] Assignee: Botho Böhnke, Aachen, Fed. Rep. of Germany

[21] Appl. No.: 562,998

[22] Filed: Dec. 16, 1983

Related U.S. Application Data

[63] Continuation of Ser. No. 411,108, Aug. 24, 1982, abandoned, which is a continuation-in-part of Ser. No. 301,034, Sep. 10, 1981, abandoned, which is a continuation-in-part of Ser. No. 265,585, May 20, 1981, abandoned, which is a continuation of Ser. No. 125,782, Feb. 29, 1980, abandoned.

[30] Foreign Application Priority Data

Mar. 2, 1979 [DE] Fed. Rep. of Germany ....... 2908134

[51] Int. Cl.³ .............................. C02F 3/04; C02F 3/30
[52] U.S. Cl. .................................... 210/605; 210/617; 210/630; 210/903
[58] Field of Search ............... 210/605, 630, 626, 627, 210/615-619, 903, 624, 195.3, 150, 151, 614

[56] References Cited

U.S. PATENT DOCUMENTS

| | | | |
|---|---|---|---|
| 4,134,830 | 1/1979 | Skogman et al. | 210/903 |
| 4,160,724 | 7/1979 | Laughton | 210/903 |
| 4,179,374 | 12/1979 | Savage et al. | 210/903 |
| 4,183,809 | 1/1980 | Klapwijk et al. | 210/903 |

FOREIGN PATENT DOCUMENTS 51-8754 1/1976 Japan .................................. 210/605

OTHER PUBLICATIONS

Arthur, R. M.; "New Concepts and Practices in Activated Sludge Process Control"; Ann Arbor Science; pp. 99-101 (1982).
Eckenfelder, W. W. Jr. et al. "Biological Waste Treatment"; The MacMillan Co. N.Y.; pp. 319-321 (1963).

*Primary Examiner*—Benoit Castel
*Attorney, Agent, or Firm*—Karl F. Ross

[57] ABSTRACT

A plant for the treatment of waste water, such as municipal sewage and industrial wastes containing organic matter which must be decomposed, comprises a mechanical clarifier for the removal of non-degradable and coarse contaminants, an activation vessel for a first digestion stage operating with an oxygen content close to 0 mg/l with facultative anaerobic operation, an intermediate clarifier, an aeration stage formed by a trickling filter for oxidative decomposition, an afterclarifier and an arrangement for removal and preferably the treatment of surplus sludge. An unaerated mixture (facultative anaerobic) basin is provided upstream of the afterclarifier in which water from the trickling filter is contacted with surplus sludge from the activation basin.

2 Claims, 1 Drawing Figure

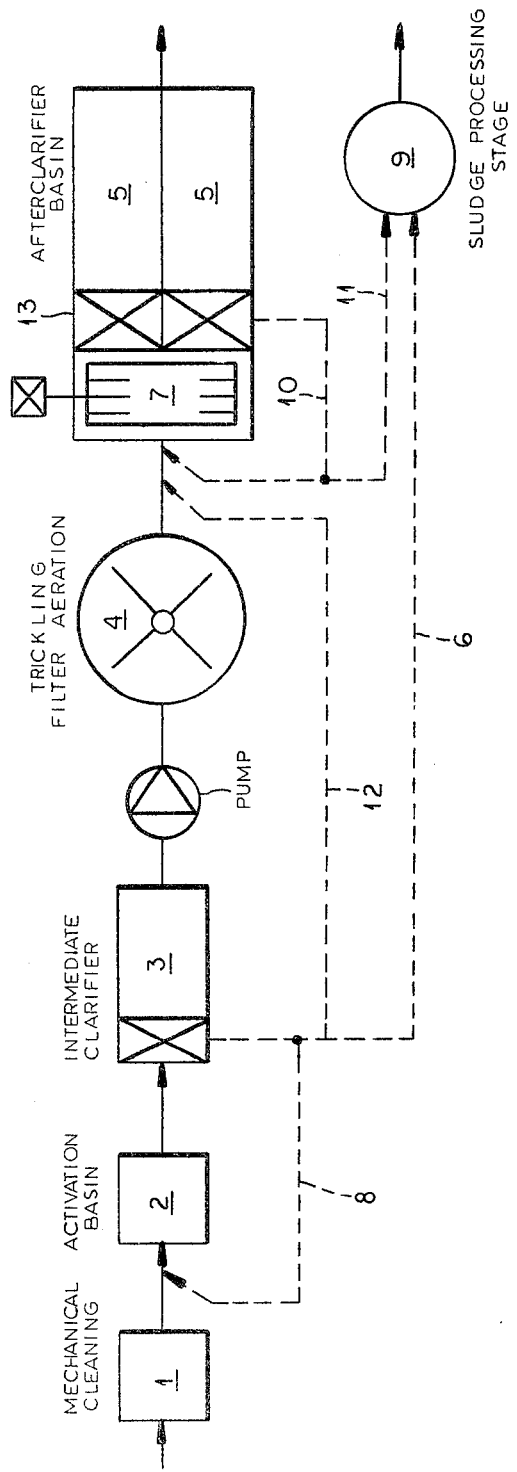

BIOLOGICAL WASTE-WATER-TREATMENT METHOD

CROSS REFERENCE TO RELATED APPLICATIONS

This is a continuation of Ser. No. 411,108 filed Aug. 24, 1982, which is a continuation-in-part of Ser. No. 301,034 filed Sept. 10, 1981 which was a continuation-in-part of Ser. No. 265,585 filed May 20, 1981 as a continuation of Ser. No. 125,782 filed Feb. 29, 1980. The subject matter hereof is related to the subject matter of our application Ser. No. 006,760 filed Jan. 26, 1979 and entitled Plant for the Treatment of Waste Water by the Activation Sludge Process. This latter application, has been replaced by a continuation application Ser. No. 178,361 filed Aug. 15, 1980 and later by a continuation-in-part application Ser. No. 301,052 filed Sept. 10, 1981 as a continuation-in-part also of Ser. No. 069,338 filed Aug. 23, 1979 as a continuation of Ser. No. 831,043 filed Sept. 6, 1977. All of the above-identified applications are now abandoned.

FIELD OF THE INVENTION

The present invention relates to a method of treatment of waste water, especially municipal sewage and industrial wastes containing biodegradable organic materials and, more particularly, to the treatment of such waste water where the waste water may contain organic materials which are difficult to decompose by conventional techniques.

BACKGROUND OF THE INVENTION

As will be apparent from the literature mentioned in our above-identified prior abandoned applications and the art of record in the files thereof, systems for the treatment of waste water using biodegradation so as to produce an effluent which can be discharged safely into bodies of water, and to produce sludge in sufficiently small quantities so as to enable the sludge to be treated and handled, have developed greatly in recent years.

For example, it is known to provide a plant for the treatment of waste water which includes a mechanical clarifier (rake and sand trap) for the mechanical preremoval of coarse contaminants of the waste water and contaminants which may be of an inorganic and/or nonbiodegradable nature. The precleaned waste is introduced into an activation basin which serves as a first biologically active digestion stage, then into an intermediate clarifier, into an aeration stage, into an afterclarifier basin and then into a unit for discharging and, advantageously, treating the surplus sludge generated in the process.

The waste water to be treated is generally passed in succession to the activation basin, the intermediate clarifier and the aeration stage with the waste water then being introduced into the afterclarifier basin. The biozones or biocoenoses of the activation basin and the aeration basin are separated from one another.

For the purpose of this description, the term "waste water" is intended to mean municipal or other communal sewage and/or industrial waste waters which contain sufficient contaminating organic matter to warrant biological treatment.

When we refer to a "basin" herein, we intend to include treatment vessels of any conventional design for the stated purpose and even assemblies of basins, tanks or vessels which may be physically separated from one another or in close proximity and which may be connected by ducts, overflow weirs or any other means into a single functional unit. The preferred treatment of the surplus sludge is in fermentation chambers which may be followed by driers or other (chemical) sludge processors, gasifiers, etc.

In the conventional plant for the treatment of waste water (see German patent document DE-OS No. 26 40 875 corresponding to our abandoned U.S. application Ser. No. 831,043 referred to above) the aeration stage makes use of an aeration basin with surface aerators or the like and the design and operation of this stage is such that the activation basin functions as a maximum-loading stage with a volumetric loading of about 10 kg $BOD_5$ per cubic meter per day (kg $BOD_5/m^3.d$). The intermediate clarifier provides a separation of the biozones and the sludge from this second activation stage (aeration) is only recycled to this intermediate clarifier or is discharged as surplus sludge.

The activation basin (aeration) thus functions as an adsorption basin in which an adsorptive, self-filtering and coagulating removal of organic compounds which are difficult to decompose is carried out.

This system has been found to be satisfactory in many cases and has been improved, as described in the aforementioned copending applications, by providing it with an aeration stage with injections of oxygen. With these systems, it is possible to obtain elimination rates of 50% to 70%, especially when the content of the compounds which are difficult to decompose in the waste water is relatively small. The activation basin can then be operated with an oxygen content of 1 to 2 mg/l (milligrams per liter) in the aerobic range.

OBJECTS OF THE INVENTION

It is the principal object of the present invention to provide an improved waste-water-treatment method which is more effective for the treatment of wastes containing relatively large quantities of difficult-to-decompose organic substances than the earlier systems described above.

Another object of the invention is to provide a process for the treatment of waste water which is capable of higher degrees of waste water cleaning, even where the waste water has a relatively high content of difficult-to-decompose compounds and which can be used effectively for communal sewage and/or industrial waste waters having a significant degree of contamination with organic compounds.

Another object of this invention is to provide an improved method of treating waste waters of the type described without disadvantages which inhere in some of the earlier sewage treatment processes.

Yet another object of the invention is to provide an improved method of operating a plant for the treatment of waste water.

It is also an object of the invention to extend the principles of our applications as mentioned above.

SUMMARY OF THE INVENTION

The present invention is applicable specifically to sewage and waste-water-treatment plants which include a mechanical clarifier for the coarse removal of nonbiodegradable substances, an activation or adsorption basin for a first digestion stage, an intermediate clarifier, an aeration stage, an afterclarifier basin, and means for the discharge and preferably the treatment of surplus sludge, and in which the waste water traverses those units in succession.

According to the present invention, however, the adsorption or activation basin is operated with a sludge age of 2 to 10 hours and a reduced oxygen content which can be approximately 0 mg/l (liter) and by a facultative anaerobic process so that microbes present in this basin of an aerobic and facultative anaerobic type. According to an essential feature of the invention, moreover, the aeration stage is formed as a trickling filter operating in the aerobic range, e.g. in which the material to be treated passes through a bed or mass of material forming the trickle body and advantageously is introduced in the form of droplets which can be sprayed onto the bed (i.e. a droplet-forming or percolating body).

Surprisingly, the critical activation-basin sludge age and the facultative anaerobic operation of the activation basin, together with the nitrification step carried out in the trickling filter, co-operate in a unique manner to provide low-energy high-efficiency sewage treatment. While, in the past, every effort has been made to carry out decomposition to a maximum degree in the first activation stage, even when this stage was operated with low oxygen level and as a denitrification stage (the high degree of decomposition being guaranteed by an extremely high sludge age), we have now found that the treatment time can be reduced and the results improved by operating at the lower sludge age of the invention in a facultative anaerobic mode in the first activation basin to crack (without necessarily full decomposition) the difficult-to-decompose organic substances and induce at least some of the cracking fragments to adsorb upon the sludge particles.

Under the conditions of the invention, therefore, the activation basin does not operate strictly as a denitrification stage nor does it function as a nitrification stage as these terms are used in the sewage-treatment field.

The activation basin, rather, functions as a cracking-/adsorption basin, primarily serving to break down the difficult-to-decompose substrates to fragment which can be partly adsorbed on the sludge.

When the sludge is separated from the effluent of the activation basin, therefore, it carries with it these incompletely decomposed fragments which contribute significantly to an improvement in the energy yield of the sludge when the latter is incinerated or gasified.

Furthermore, since these fragments are not fully decomposed in the first or activation stage, the energy consumption of the latter is reduced. It has already been indicated that, without loss of treating effectiveness, the treatment time in the activation basin is reduced and hence the overall treatment time is similarly lowered by comparison with systems operating the first biological degradation stage exclusively as a denitrification stage.

The fragments which are not carried off by adsorption on the activation-basin sludge are readily decomposed in the trickling filter.

According to the invention, moreover, a mixing basin, preferably unaerated, is provided upstream of the afterclarifier and receives, in addition to water from the trickling filter, surplus sludge from the activation or adsorption basin (facultative anaerobic).

The oxygen content in the effluent of the trickling filter will be higher than that in the activation basin and, specifically, should be above 2 mg/l.

According to a further feature of the invention, in a preferred embodiment thereof, surplus sludge from the activation basin is recycled to the activation basin and is in addition fed to the sludge-discharge stage which, as noted, can include a fermentation chamber or other conventional means for the disposal of the sludge.

Surplus sludge also can be withdrawn downstream of the mixing basin from the afterclarifier basin, advantageously by an appropriate collection funnel, so that this sludge can, on the one hand, be recycled to the mixing basin and, on the other hand, be fed to the device for the discharge and preferably treatment of the surplus sludge.

While waste-water treatments have made use of trickling filters heretofore, these filters have never, to our knowledge, been utilized in any way analogous to such use in the present invention.

In the sewage-treatment plant of the present invention, the activation basin carries out, apart from a partial biological cleaning of the waste water, a significant exclusion of the raw substrates from the further-downstream units by an elimination of at least some of the difficult-to-decompose compounds so that the latter are at least partly broken down to more readily decomposable organic compounds.

The further oxidation of the organic compounds is effected in the trickling filter and, with proper adjustment of the oxygen content therein, in a highly stable manner, so that with a corresponding volumetric loading a nitrification is also carried out.

When the mixing basin is operated or designed to operate at an oxygen content of 0 mg/l and in a facultative anaerobic mode, the unaerated mixing basin is found to result in a denitrification supported by the feed of surplus sludge from the activation basin.

In a system according to our invention, aerobic procaryotic microorganisms function facultatively in a fermentation process in the first stage. By contrast, conventional systems operate in a stable aerobic phase with corresponding microorganisms. The metabolic cycle in the activation basin operates according to our invention by a substrate-bound phosphorylization. In the earlier systems the metabolic cycle proceeds via an oxidative phosphorylization process. The trickling filter is operated exclusively as a nitrification stage while the mixing basin between the trickling filter and the afterclarifier is operated as a denitrification stage.

BRIEF DESCRIPTION OF THE DRAWING

The sole FIGURE of the drawing is a flow diagram representing a plant in accordance with the present invention.

SPECIFIC DESCRIPTION

In the drawing we have shown a plant for the treatment of waste water which comprises a mechanical clarifier 1 for the removal of inorganic objects and the coarse precleaning of the water so that a minimum of nondecomposable solids is entrained with the waste water.

The precleaned waste water is fed to a basin 2 forming a first activation adsorption stage and the outflow therefrom is supplied to an intermediate clarifier 3 before the decanted product is fed to an aeration stage 4 from which the effluent passes to an afterclarifier basin 5.

We also provide means, e.g. a duct system 6, for the removal and preferably the treatment of surplus sludge.

The biozones of the adsorption basin 2 and the aeration stage 4 are separated, in the embodiment shown, by the intermediate clarifier 3.

The adsorption basin 2 is designed for operation with an oxygen content of about 0 mg/l with the result that the microorganisms which are found in basin 2 are aerobic or facultative anerobic, such as procaryotic organisms able to survive without oxygen. The dearth of oxygen in this basin establishes the facultative anaerobic mode.

The aeration stage 4 is constituted here as a second biological degradation stage and is designed as a trickling filter. While only one trickling filter bed has been shown at 4 in the drawing, it should be understood that the stage 4 illustrated can also represent a plurality of parallel or tandem (series) trickling filters. This stage operates in an aerobic mode with a sufficient oxygen level (see the following example) to effect oxidative decomposition.

Upstream of the afterclarifier basin 5 we provide an unaerated mixing basin 7 which receives, apart from the water traversing the trickling filter 4, surplus sludge from the adsorption basin 2 via a line 12. No feedback exists, however, to basin 2 from any stage downstream of clarifier 3.

In addition, as represented by the arrow 8, means is provided by recycling sludge from the adsorption basin 2 to the input side thereof.

The sludge-removal means 6 can deliver the excess sludge to the processing stage 9, e.g. a fermentation chamber. The sludge may thereafter be dried and used for soil improvement or incinerated.

Furthermore, means can be provided at 13 for removing surplus sludge at a location between the mixing basin 7 and the afterclarifier 5, this sludge being either delivered at 11 to the sludge-processing stage 9 or recycled via line 10 to the mixing basin 7. A pump feeds the trickle-body or droplet-body stage 4.

A relatively low sludge age of 2 to 10 hours in the adsorption basin is considered critical; thus, the rates at which suspended solids are withdrawn from this basin via the intermediate clarifier and recycled to the basin are adjusted to maintain such a sludge age.

We have found that this critical range of sludge age surprisingly suffices to ensure elimination of all pathogenic substrates in the adsorption basin. This result is especially noteworthy because sludge ages of almost an order of magnitude greater have hitherto been deemed to be required for a satisfactory level of first-stage decomposition.

SPECIFIC EXAMPLES

EXAMPLE I

The illustrated plant was used in the treatment of municipal waste water and was designed for a specific waste-water feed of 200 l per person per day (l/P.d) and an hourly feed of 13 l/P.h (liters per-inhabitant per-hour) with a per-person oxygen demand of 60 g $BOD_5$/P.d. With a cleaning efficiency of 95% and a $BOD_5$ effluent value of 15 mg/l, the following requirements are determined:

a. Single-stage nitrification-activation unit ($B_{Total\ oxygen}$=0.15) V=162 l/P
b. Single-stage conventional trickling filter with $B_{volumetric\ loading}$=400 g/m$^3$ V=188 l/P
c. With an oxygenated trickling filter and maximum loading of an adsorption stage in a facultative anaerobic mode, according to our present invention, V=107 l/P.

The energy requirement per inhabitant can be compared to the requirements of the conventional process:
with the nitrification unit at about 15 kWh/P.a;
with the conventional trickling filter at about 9 to 10 kWh/P.a; and
with the activation in a trickling-filter plant according to our invention at about 9 to 10 kWh/P.a. (The factor a is a constant.)

The waste water mechanically precleaned in stage 1 is fed to the activation basin 2 and has a residence time therein of 28 minutes for a volume of the adsorption basin of 600 m$^3$ and, in the present example, an organic volumetric loading of 10 kg $BOD_5$ per m$^3$ per day.

At a high sludge loading of $B_{total\ oxygen}$ of about 6 and a low energy density of the adsorption basin of about 25 W/m$^3$ (watts per cubic meter) of volume, with an average or large-bubble aeration of the activated sludge forming therein and a sufficiently endogeneous respiration of the biozone (dry-substance content of 1.5 to 2.0 g/l) there is insufficient oxygen supply for base or substrate respiration.

The oxygen content in the basin is about 0 mg/l.

The biological process thus conducted in this vessel, because of the insufficiency of oxygen, must be facultative anaerobic. An oxidative decomposition is not possible. The metabolic cycle must be effected via a substrate-bound phosphorylization of the type which occurs in fermentation. Many bacteria (procaryotic cells) and yeasts (eucaryotes), which normally reproduce in aerobic media utilizing oxidative phosphorylization with high energy, are effective under the conditions of the present invention for the fermentation contributing only 1/19 of the otherwise developed energy. It is this which we mean when stating, in accordance with the invention, that the adsorption basin 2 is operated in a facultative anaerobic mode.

With described sludge content in the adsorption basin 2 and the growth rate of the biomass with the extensive consumption of the organic compounds, other factors must be considered.

The sludge age in the activation basin is within the critical range of 2 to 10 hours. During conventional aerobic activation process the $BOD_5$/COD ratio, for example 300/600=0.5 with raw water, is shifted by increase of the COD value to a range of 0.28 to 0.11. With the plant of the present invention, the ratio can remain the same.

In about 30% of the tests carried out with the method of our present invention with different waste waters, there was a shift in the $BOD_5$/COD ratio by increase of the $BOD_5$ value. This reversal of the expected characteristics appears to be related to a breaking down or cracking of the difficult-to-decompose compounds. The result is that the raw substrate of the waste water is decomposed far more effectively in the subsequent aerobic biologically effective trickling filter 4.

In the trickling filter 4, a nitrification of the on coming organic compounds is carried out. Since the oxygen available in this stage is many times greater than that required by the aerobic microorganisms, no denitrification is effected.

The waste water treated in the trickling filter is subjected to a particularly excellent cleaning effect with reduced $NH_3$ content but high $NO_3$ content. Further cleaning by stripping of the nitrogen and recovery of the converted energy is effected in the mixing basin 7 which simultaneously functions as a denitrification stage.

The residence time of the mixing basin 7 is about ½ h and its volume is 600 m³. From this stage, without aeration, the effluent can pass into the afterclarifier 5 which has a residence time of 2.5 h and a basin volume V=3250 m³.

The collected facultative active sludge in the collecting funnels of the afterclarifier 5 is recycled via line 10 and the surplus sludge is passed via line 11 to the sludge-treating stage 9.

The use of mixing vanes in stage 7 and the feed of excess sludge from the intermediate clarifier 3 into that stage ensure rapid agglomeration of the active sludge to a flocculate and thus optimum conditions via the feed of facultative active sludge for the denitrification of the $NO_3$ which has been formed.

The mixing basin can be supplied with flocculating agents and/or adsorbents, e.g. activated carbon in the form of brown coal (lignite), to promote flocculation of the agitated sludge. Any conventional flocculating agent may be used.

The continuous recirculation of the flocculated sludge in the mixing basin 7, preferably with the addition of the activated carbon thereto, allows the relatively small basin volume (V=600 m³) to sustain rapid denitrification and further decomposition of any remaining organic compounds.

Since the previous process stages have already decomposed the easily decomposable organic compounds, the facultative anaerobic stage following the trickling filter 4 enables an attack upon any surviving difficult-to-decompose compounds.

The active sludge resulting from the trickling filter 4 is heavy and sediments rapidly, after the treatment in the mixing basin 7, in the afterclarifier 5. The residence time in the afterclarifier, by comparison with earlier waste-water treatment processes, can be reduced by about 50%.

Thus the plant of the present invention operates with a sequence of three stages, namely, the activation stage, trickling filter and mixing stage respectively operating in facultative anaerobic, aerobic (oxidative) and facultative anaerobic modes.

This changeover between different metabolic processes has been found to provide a surprisingly effective waste water purification and treatment.

It should be understood that reference to an oxygen content of about 0 mg/l includes both zero and values slightly different from 0. Reference to microbes are intended to refer to a variety of living organisms.

EXAMPLE II

This example is illustrative of the treatment of municipal sewage. The apparatus, utilizing the elements shown in the drawing, is dimensioned to accommodate on the average 80,000 people. The specific sewage production amounts to 200 liters per person a day and the composition on the average is as follows:

|  | Inorganic | Organic | Total | BOD$_5$ |
|---|---|---|---|---|
| Settlable Suspended Matter | 20 | 40 | 60 | 20 |
| Unsettlable Suspended Matter | 5 | 10 | 15 | 10 |
| Soluble Matter | 75 | 50 | 125 | 30 |
| Total | 100 | 100 | 200 | 60 grams/ |

-continued

|  | Inorganic | Organic | Total | BOD$_5$ |
|---|---|---|---|---|
|  |  |  |  | person/day |

After coarse cleaning by raking and sand removal in stage 2, the sewage is fed to the high-load adsorption basin 2. Basin 2 is dimensioned to provide volumetric loading $B_V = 9$ to $10$ kg $BOD_5/m^3.d.$ This corresponds, under the conditions set forth, to a volume of 500 m³.

The sewage-solution mixture is then fed to the intermediate clarifier 3 in which the water is decanted from the sludge and about 80 tons (dry weight) of sludge per day is recovered.

About 73.6 tons (dry weight) per day of this sludge is recycled and the balance of 6.4 tons (dry weight) per day is wasted. This corresponds to a sludge age in the adsorption basin of about 5 hours. Experiments have shown that the sludge age varies about this mean value but within the range of 2 to 10 hours referred to above.

The first biological stage, i.e. the adsorption stage, has an elimination rate BOD$_5$ of 60 to 75% (average about 65%) and a COD of 50–65% (average about 55%).

The effluent from the clarifier 3 is practically free from sludge and is of especially high quality (BOD$_5$ of approximately 100 mg/liter and COD approximately 250 mg/liter).

Without dilution, this effluent is trickled in the filter 4 and the latter is found to operate at high efficiency in a nitrification mode without any plugging thereof. The volumetric load of the trickle filter ranges from 400–600 BOD$_5$/m³.d. The water-sludge matter is then fed to the nitrification and denitrification stage 7 followed by the after-clarifier 5.

We claim:

1. A method of treating waste water in the form of communal or industrial waste water containing a significant amount of difficult-to-decompose organic compounds, which comprises the steps of:
    (a) mechanically removing impurities from the waste water to preclean same;
    (b) biodegrading the precleaned waste water by treatment in a facultative anaerobic mode with an oxygen content of about zero mg/liter in the presence of procaryotic cells to form a partially cleaned waste water and sludge as a product with adsorption by the sludge of fragments of difficult-to-decompose compounds cracked in the treatment;
    (c) subjecting the product of step (b) to intermediate clarification to separate an active sludge from an effluent, recycling a portion of said active sludge to step (b) and generating surplus sludge;
    (d) maintaining the sludge age in step (b) between 2 and 10 hours by controlling the rate at which said product is withdrawn from step (b) and the rate at which said active sludge is partially recycled from step (c) to step (b);
    (e) subjecting the effluent of step (c) to aeration with aerobic decomposition of residual fragments of said difficult-to-decompose compounds and nitrification in a trickling filter to produce a further sludge and effluent in the product of the trickling filter, the oxygen concentration in said trickling filter being such that the oxygen content of the outlet thereof is greater than 2 mg/liter;

(f) combining the product of step (e) in a mixing stage with surplus sludge derived at least in part from step (c), agitating and flocculating sludges in said mixing stage, and subjecting the mixture to facultative anaerobic decomposition with an oxygen content of about zero mg/liter and simultaneous denitrification for a period of about half an hour;

(g) subjecting the product of step (f) to afterclarification for a period of about two-and-one-half hours to form a discharge effluent and an activated sludge; and (h) maintaining the biozone formed by the treatment of step (b) separate from the biozone formed by step (e) by preventing feedback therebetween.

2. The method defined in claim 1, further comprising the steps of:

(i) recycling a portion of the activated sludge from said afterclarifier of step (g) to the mixing stage of step (f); and (j) processing the remainder of the activated sludge from steps (c) and (g).

* * * * *